Patented Aug. 14, 1945

2,382,334

UNITED STATES PATENT OFFICE 2,382,334

ION EXCHANGE PRODUCTS AND THEIR PREPARATION

Ray Riley, Moorestown, and Frederick C. Nachod, Mount Holly, N. J., assignors to The Permutit Company, New York, N. Y., a corporation of Delaware No Drawing. Application May 29, 1943, Serial No. 489,072

8 Claims. (Cl. 252—179)

This invention relates to organic cation exchange materials having improved properties and to the preparation of such materials. More particularly, the invention is concerned with the preparation of high quality cation exchangers that can be regenerated with acids or various salts, and that may be used for conditioning water and various other purposes.

Organic cation exchangers have been prepared by treating various organic carbonizable raw materials such as wood, lignite, peat, bituminous coal and similar materials with a strong sulfonating agent such as concentrated or fuming sulfuric acid, chlorsulfonic acid, $SO_3$ gas and the like, as described for example in Smit Patent No. 2,191,063 and Liebknecht Patent No. 2,191,060. Such materials have been manufactured and sold commercially and have proved very successful for softening and otherwise conditioning water as well as for various other processes involving cation exchange.

It has been found, however, that the quality of the cation exchange product will vary depending upon the particular reagents employed. For example, if bituminous coal is sulfonated with a liquid sulfonating agent such as fuming sulfuric acid, the product obtained has very hard grains and imparts very little, if any, color to water even after being soaked in the water for several hours. The exchange capacity of such a product, however, is not as high if used in a cyclic cation exchange process with acid regeneration (referred to herein as the hydrogen cycle) as it is when regenerated with the solution of common salt (referred to herein as the sodium cycle).

It has also been recognized that products with high exchange capacities in both the hydrogen and sodium cycles are obtained, if the sulfonation is carried out with $SO_3$ gas, e. g., as described in Liebknecht Patent No. 2,191,059. A product made from bituminous coal or other organic raw material and $SO_3$ gas has a relatively high exchange capacity but has the disadvantage of being relatively soft compared to a product made with a fuming sulfuric acid. In addition, such a product generally tends to impart more color to water after being immersed in the water for several hours.

One object of this invention is to produce an organic cation exchanger having good physical qualities along with a high exchange capacity.

Another object of the invention is to produce such a product with good color stability, i. e., the quality to impart little, if any, color to water even after soaking for several hours.

A further object is the provision of a high quality organic cation exchanger having the desirable physical qualities of a product made by sulfonation with a liquid agent combined with high exchange capacity in both the hydrogen and sodium cycle.

Other objects will be described and will be apparent from the following description of the invention.

It has been found that an organic cation exchanger with both high exchange capacity and excellent physical properties can be prepared by sulfonating a carbonaceous material with a concentrated liquid sulfonating agent, thereafter washing and drying this product and giving it a second sulfonating treatment with sulfur trioxide gas. If the sulfonating treatment with sulfur trioxide gas is applied directly to the raw carbonaceous material, a high capacity product is obtained, but the product is relatively soft and has a pronounced tendency to throw color, i. e., to impart color to water after several hours of soaking.

However, this treatment with sulfur trioxide gas if applied to a product that has previously been sulfonated with a concentrated liquid sulfonating agent, such as fuming sulfuric acid, produces the desirable quality of a high exchange capacity without destroying the original high degree of hardness of the product and its resistance to color throwing.

The second sulfonating treatment with the gas does not produce any substantial improvement in exchange capacity unless the product treated is fairly dry at the time of application of the gas. For example, the sulfur trioxide does not produce any substantial improvement in exchange capacity if applied directly to the wet sulfonated granules from the liquid sulfonating treatment before they have been washed.

The material sulfonated with liquid does not have to be oven dried before the gaseous sulfonation, but may contain appreciable quantities of moisture up to about 18%. Increases in exchange capacity on a weight basis of the order of 30% for both the hydrogen and sodium cycle have been obtained when the material treated with $SO_3$ gas contains 12% moisture. In general, therefore, the improvement in exchange capacity from the gaseous sulfonation is inversely proportional to the moisture content of the product treated, and in order to obtain a substantial improvement, this moisture content should not exceed about 18%.

The liquid sulfonating step may be carried out in various ways, as will be understood by those skilled in the art. The raw organic material is preferably more or less granular in form and the acid may be added to it slowly with suitable agitation to completely wet the granules. The temperature of the reaction should be kept reasonably low, the range of 60 to 100° C. being especially suited for the production of a good commercial product. Usually a satisfactory product can be obtained by a treatment with about 0.85-4 parts by weight of concentrated sulfonating agent for each part of organic material, the total reaction time preferably lasting for several hours although shorter times may be used.

Because of the difficulty of drying the product while it is wet with concentrated sulfuric acid, it is necessary to wash the sulfonated material. After washing the material may be dried in any suitable manner, or it may be first converted to the sodium exchanging condition by means of a solution of sodium carbonate or the like.

The gaseous sulfonation may be applied to the relatively dry product in the hydrogen or sodium exchanging condition, or while the product is charged with calcium or other exchangeable cations. This second sulfonation may be carried out in various ways. One of the simplest and best procedures is to simply pass the gas up through a column of the granular product, using the gas pressure as a means of agitating the granules.

During the reaction, heat is generated and some swelling of the product takes place. To avoid overheating and to control the reaction, it is desirable to dilute the sulfur trioxide with some other gas such as air. Ratios of air to sulfur trioxide from 1:1 to 4:1 are satisfactory, although other proportions of diluting gas to sulfur trioxide may be used. The end point of the second sulfonation can readily be determined by observing the swelling of the granules. When this swelling stops, the second sulfonating reaction can be regarded as complete.

In order that the invention may be more readily understood, reference may be had to the following example of one embodiment thereof.

*Example.*—Bituminous coal, screened to 20-40 mesh, was treated with approximately three times its weight of 20% fuming sulfuric acid, the acid being added periodically in increments and thoroughly mixed with the coal to obtain as complete a reaction as possible. The temperature of the mass was maintained throughout the reaction period of about 2½ hours at approximately 60 to 100° C. The product of this treatment had a density of 358 grams per liter. The exchange capacity of this product when regenerated with dilute acid was 0.72 milliequivalent per gram or 258 milliequivalents per liter. The capacity of the product when regenerated with sodium chloride solution was 0.95 milliequivalent per gram (meq./g.) or 340 milliequivalents per liter (meq./l.).

A sample of this product was washed, dried and then sulfonated slowly with about an equal weight of $SO_3$ gas diluted with about four parts of air. After this second sulfonation, the density of the product was found to be 313 g./l. and in the hydrogen cycle its capacity was 0.98 meq./g. 306 meq./l. In the sodium cycle, its capacity was 1.34 meq./g. and 420 meq./l.

Thus, the product after the sulfonation with sulfur trioxide showed an increase of 36% and 19% by weight and by volume, respectively, in the hydrogen cycle, and an increase of 41% and 23.5% by weight and by volume, respectively, in the sodium cycle. The hardness of this product after the liquid sulfonation as determined by the "feel" test was around 90, and the product still had a hardness rating of 90 after the gaseous sulfonation.

On the other hand, products which are made directly by sulfonating bituminous coal with sulfur trioxide gas generally range between 60 and 70 on the hardness scale. The double sulfonated product was also tested for color throwing and had a color throwing rating generally within the range of 100 to 300, whereas products made by sulfur trioxide sulfonation applied to the raw material had a color throwing rating of 900 or more. This color throwing rating is a standard test determined by measuring the coloring matter left in the water after the exchange product has been treated with sodium chloride solution, rinsed and allowed to remain in contact with the last portion of the rinse water for 24 hours.

The foregoing example deals with a product sulfonated with about three parts by weight of fuming sulfuric acid before it is post-sulfonated with sulfur trioxide gas. It will be apparent, therefore, that if smaller proportions of the concentrated liquid sulfonating agent are used for the first stage of the process, the initial exchange capacity of the material will be lower and the consequent percentage increase effected by the gaseous sulfonation will be greater.

When smaller proportions of the liquid sulfonating agent are used, it will be apparent that somewhat larger quantities of sulfur trioxide may be required for the second sulfonating step if one desires to produce a product with the best exchange capacity. Considerable variation is possible for the relative proportions of liquid sulfonating agent and sulfur trioxide employed as will be understood by those skilled in the art, as long as a sufficient quantity of the concentrated liquid sulfonating agent is used in the first stage to produce a physically hard product before the treatment with sulfur trioxide is begun.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A process of preparing an organic cation exchange product which comprises sulfonating a solid organic carbonizable material with a concentrated liquid sulfonating agent, and further sulfonating the dried product, which is substantially free from sulfonating agents, with sulfur trioxide gas for a period sufficient to increase substantially the cation exchange capacity of said dried product.

2. A process of preparing an organic cation exchange product which comprises sulfonating a solid organic carbonizable material with a concentrated liquid sulfonating agent, washing and drying the sulfonated product, and further sulfonating the dried product with sulfur trioxide gas for a period sufficient to increase substantially the cation exchange capacity of said dried product.

3. In a process of preparing an organic cation exchange product, the step of treating a substantially dry solid organic cation exchanger which is substantially free from sulfonating agents and which is prepared by a liquid sulfonating treatment of a solid carbonizable material, with sulfur trioxide gas to increase the exchange capacity of said product without impairing substantially its physical hardness and its insolubility.

4. In a process of preparing an organic cation exchange product, the step of sulfonating at a temperature not greater than 100° C. with sulfur trioxide a solid sulfonated product having cation exchange properties containing less than 18% moisture and substantially free from sulfonating agents and prepared by reacting a concentrated liquid sulfonating agent with an organic carbonizable material, the period of sulfonation with sulfur trioxide being sufficient to increase substantially the cation exchange capacity of said solid sulfonated product.

5. A process of preparing a cation exchanger which comprises sulfonating a coal with fuming sulfuric acid to produce a hard water insoluble material having a capacity for exchanging cations, washing and drying said sulfonated material, and treating the dried material at a temperature not greater than 100° C. with sufficient sulfur trioxide to increase its exchange capacity.

6. A process as defined in claim 5 in which the coal is bituminous coal.

7. A process as defined in claim 5 in which the coal is lignite or brown coal.

8. A process as defined in claim 5 in which the coal is bituminous coal and the material treated with sulfur trioxide contains less than about 18% moisture.

RAY RILEY.
FREDERICK C. NACHOD.